United States Patent
Tanizawa et al.

(10) Patent No.: US 6,453,763 B2
(45) Date of Patent: Sep. 24, 2002

(54) CONTROL APPARATUS FOR HYDRAULICALLY-OPERATED VEHICULAR TRANSMISSION

(75) Inventors: Shoichi Tanizawa; Shinichi Nishio; Tetsuya Mochizuki, all of Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/847,377

(22) Filed: May 3, 2001

(30) Foreign Application Priority Data

May 23, 2000 (JP) ........................................ 2000-151732

(51) Int. Cl.$^7$ .............................................. F16H 59/00
(52) U.S. Cl. ...................................................... 74/335
(58) Field of Search ......................... 74/335; 475/129; 477/150, 152, 154

(56) References Cited

U.S. PATENT DOCUMENTS 5,992,255 A * 11/1999 Fujita et al. .................. 74/335
6,116,391 A * 9/2000 Kremmling et al. .......... 74/335

* cited by examiner

*Primary Examiner*—Dirk Wright
(74) *Attorney, Agent, or Firm*—Armstrong, Westerman & Hattori, LLP

(57) ABSTRACT

A control apparatus for a hydraulically-operated vehicular transmission, to buffer in-gear shocks in any driving condition of a vehicle, includes a pressure regulating solenoid valve for controlling an oil pressure in a hydraulic engaging element which establishes a predetermined speed transmission train of the hydraulically-operated vehicular transmission, an accumulator connected to an oil passage which is communicated with the hydraulic engaging element, a discriminator for discriminating whether the pressure accumulation in the accumulator-has been completed or not, and a controller for maintaining an outlet pressure of the pressure regulating solenoid valve at a predetermined pressure until the pressure accumulation in the accumulator has been completed and for increasing the output pressure of the pressure regulating solenoid valve, after the pressure accumulation in the accumulator has been completed, depending on a driving condition of the vehicle.

3 Claims, 6 Drawing Sheets

CONTROL APPARATUS FOR HYDRAULICALLY-OPERATED VEHICULAR TRANSMISSION

BACKGROUND OF THE INVENTION

1. Field of the Invention

The present invention relates to a control apparatus for a hydraulically-operated vehicular transmission and relates, in particular, to an apparatus in which in-gear shocks at the time of gear engagement can be reduced.

2. Description of the Related Art

As a method of controlling an oil pressure in a hydraulic engaging element of a hydraulically-operated vehicular transmission, there are the following two methods. One is a direct control method in which the oil pressure in the hydraulic engaging element is directly controlled by a pressure regulating solenoid valve. The other is an accumulator back pressure control method in which a back pressure in the accumulator connected to an oil passage communicated with the hydraulic engaging element is made variable depending on an engine load so that the oil pressure increase in the hydraulic engaging element is buffered in an oil pressure region corresponding to the engine load.

In the above-described direct control method, the oil pressure in the hydraulic engaging element should ordinarily be controlled at a high accuracy through the pressure regulating solenoid valve by a command value from en electronic control unit. Actually, however, there are variations in the performance of the pressure regulating solenoid valve and an output performance (or output characteristics) of the electronic control unit because they are mass-produced. As a consequence, at the time of gearing in with the throttle valve fully closed, at which a delicate oil pressure control is required in a low-pressure region, the oil pressure control in the hydraulic engaging element sometimes goes wrong, resulting in shocks.

In the above-described accumulator back pressure control method, on the other hand, there is the following disadvantage. Namely, at the time of gearing in with the throttle valve fully closed, if an accelerator is depressed right before the completion of pressure accumulation in the accumulator, the oil pressure in the hydraulic engaging element increases without being subject to the pressure increase buffering function in an oil pressure region depending on the engine load, resulting in shocks.

In view of the above-described points, the present invention has an object of providing a control apparatus for a hydraulically-operated vehicular transmission in which the accumulator back pressure control method and the direct control method are combined so that the in-gear shocks can be buffered under any driving conditions of the vehicle.

SUMMARY OF THE INVENTION

In order to attain the above and other objects, the present invention is a control apparatus for a hydraulically-operated vehicular transmission comprising: a pressure regulating solenoid valve for controlling a pressure in a hydraulic engaging element which establishes a predetermined speed transmission train of the hydraulically-operated vehicular transmission; an accumulator connected to an oil passage which is communicated with the hydraulic engaging element; discriminating means for discriminating whether a pressure accumulation in the accumulator has been completed or not; control means for maintaining an outlet pressure of the pressure regulating solenoid valve at a predetermined pressure until the pressure accumulation in the accumulator has been completed and for increasing the output pressure of the pressure regulating solenoid valve, after the pressure accumulation in the accumulator has been completed, depending on a driving condition of the vehicle.

In the present invention, what the pressure regulating solenoid valve shares is the pressure increase in the hydraulic engaging element after the completion of pressure accumulation in the accumulator. Even if the accuracy in the pressure control in the low-pressure region becomes poor by variations, due to mass production, in the performance of the pressure regulating solenoid valve or the output performance in the electronic control circuit, the oil pressure increase in the hydraulic engaging element in the low-pressure region is buffered by the accumulator. Therefore, the occurrence of in-gear shocks with the throttle valve fully closed can surely be buffered.

Further, at the time of gearing in with the throttle valve fully closed, even if the accelerator is depressed right before the completion of pressure accumulation in the accumulator, the in-gear shocks can surely be buffered as a result of control, by the pressure regulating solenoid valve, of the oil pressure in the hydraulic engaging element after the completion of accumulation.

The following arrangement is also conceivable. Namely, a sensor for detecting a stroke of a piston in the accumulator is provided. When the piston is at a full stroke, a discrimination or judgement is made that the pressure accumulation in the accumulator has been completed. This arrangement, however, requires a stroke sensor and becomes high in cost. Here, the hydraulic engaging element transfers, during the pressure accumulation of the accumulator, from an open state to an engaged state. Therefore, when the degree of slipping of the hydraulic engaging element has lowered to a predetermined value, a judgement can be made that the pressure accumulation in the accumulator has been completed. The degree of slipping of the hydraulic engaging element can be calculated from the rotational speed of the input shaft and the rotational speed of the output shaft of the transmission. In addition, these rotational speeds can be detected by rotational speed sensors which are originally provided in the transmission. Therefore, there is no need of providing a special sensor for discriminating the completion of pressure accumulation in the accumulator. The cost can thus be made small.

In order to improve the response of gearing in, it is desired, during pressure accumulation in the accumulator, to maintain the output pressure of the pressure regulating solenoid valve at a predetermined pressure which is higher than the oil pressure in the hydraulic engaging element at the time of completion of pressure accumulation, whereby the time required to the completion of pressure accumulation is prevented from being prolonged. However, if the output pressure of the pressure regulating solenoid valve is maintained at this kind of predetermined pressure until the completion of pressure accumulation in the accumulator, the oil pressure in the hydraulic engaging element will rapidly rise from the oil pressure at the time of completion of pressure accumulation to the predetermined pressure, resulting in the occurrence of shocks. In such a case, the following arrangement may be made. Namely, as a value to discriminate the degree of slipping in the hydraulic engaging element, there are set a predetermined first value which corresponds to the state of under pressure accumulation and a predetermined second value which corresponds to the state of completion of pressure accumulation. Until the degree of slipping falls to the first predetermined value, the output pressure in the pressure regulating solenoid valve is maintained at a predetermined value. Until the degree of slipping lowers to the predetermined second value after it has lowered below the predetermined first value, the output pressure of the pressure regulating solenoid valve is gradually decreased from the above-described predetermined pressure.

Once the slipping degree has fallen below the predetermined second value, the output pressure of the pressure regulating solenoid valve is increased at a pressure increase characteristic depending on the driving condition of the vehicle. According to this arrangement, the output pressure of the pressure regulating solenoid valve is gradually decreased after the slipping degree has fallen below the predetermined first value. Therefore, when the slipping degree has fallen to the predetermined second value, the output pressure of the pressure regulating solenoid valve is made to coincide with the oil pressure in the hydraulic engaging element at the time of completion of pressure accumulation. The occurrence of shocks due to an increase in the oil pressure right after the completion of pressure accumulation can thus be prevented.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
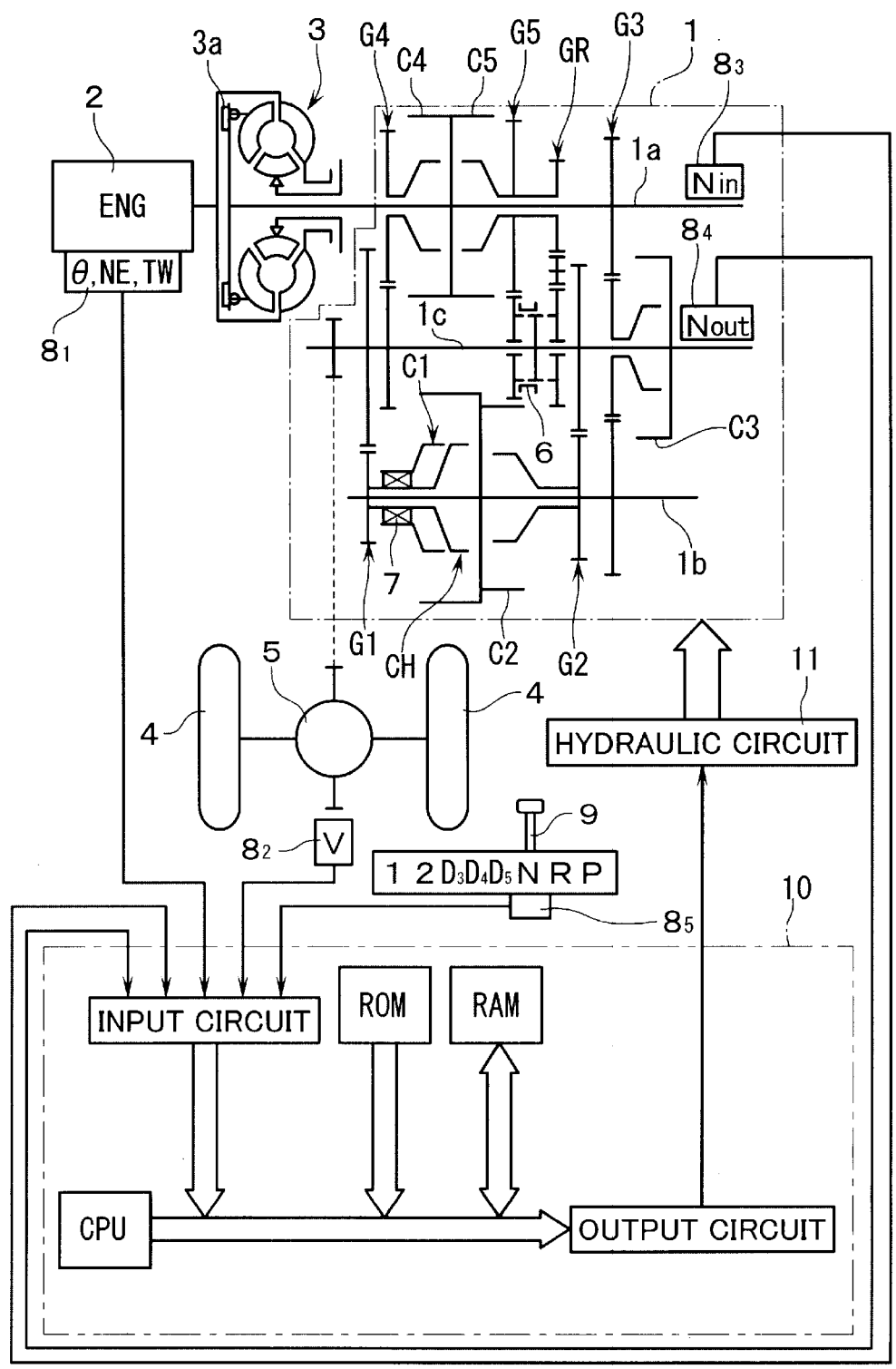
FIG. 1 is a block diagram showing a transmission and a control system to which the present invention is applied.

With reference to FIG. 1, reference numeral 1 denotes a hydraulically-operated vehicular transmission for providing speed changing of five forward transmission trains and one reverse transmission train. The transmission 1 is provided with a first input shaft 1$a$ which is connected to an engine 2 through a fluid torque converter 3 which is equipped with a lock-up clutch 3$a$; a second input shaft 1$b$ which rotates synchronously with the first input shaft 1$a$; and an output shaft 1$c$ which is connected to driving wheels 4 of a vehicle through a differential gear 5. Between the second input shaft 1$b$ and the output shaft 1$c$, there are disposed in parallel with each other a 1st-speed transmission train G1 and a 2nd-speed transmission train G2 for forward running. Between the first input shaft 1$a$ and the output shaft 1$c$, there are disposed in parallel with each other 3rd-speed through 5th-speed transmission trains G3, G4, G5 and a reverse transmission train GR. 1st-speed through 5th-speed hydraulic clutches C1, C2, C3, C4, C5, which are defined as hydraulic engaging elements, are respectively interposed in these forward transmission trains so that each of the forward transmission trains can be selectively established by the engagement of respective hydraulic clutches. The reverse transmission train GR and the 5th-speed transmission train G5 use the 5th-speed hydraulic clutch C5 in common with each other. The 5th-speed transmission train G5 and the reverse transmission train GR are arranged to be selectively established by a switching operation of a selector gear 6 on the output shaft 1$c$, between the forward running side on the left side as seen in the figure and the reverse running side on the right side, respectively. The second input shaft 1$b$ is connected through a gear to the gear train of the 3rd-speed transmission train on the input side of the 3rd-speed hydraulic clutch C3 which is disposed on the output shaft 1$c$. The second input shaft 1$b$ rotates synchronously with the first input shaft 1$a$.

In the 1st-speed transmission train G1, a one-way clutch 7 which allows for an overrunning of the output side is interposed between the 1st-speed hydraulic clutch C1 and the gear train of the 1st-speed transmission train G1 on the output side of the 1st-speed hydraulic clutch C1. Further, a 1st-speed holding clutch CH which directly connects the output side to the gear train of the 1st-speed train G1 is built in the 1st-speed hydraulic clutch C1. In this manner, by the engagement of the 1st-speed holding clutch CH, the 1st-speed transmission train G1 can be established in a state in which the overrunning of the output side is not allowed, i.e., in a state in which the engine brake operates.

There are provided an electronic control circuit (or unit) 10 which is made up of a microcomputer which receives input signals from: an engine sensor $8_1$ for detecting a throttle opening degree $\theta$, rotational speed (or rotational frequency) NE, cooling water temperature TW, or the like of the engine 2; a vehicle speed sensor $8_2$ for detecting the vehicle speed V based on the rotational speed of the differential gear 5; rotational speed sensors $8_3$, $8_4$ for detecting the rotational speed Nin of the input shaft 1$a$ and the rotational speed Nout of the output shaft 1$c$, respectively, of the transmission 1; and a position sensor $8_5$ for detecting the position of a selector lever 9 disposed inside the vehicle. A hydraulic circuit 11 for the hydraulic clutches is also provided. Solenoid valves which are built in the hydraulic circuit 11 and which are described in more detail hereinafter are controlled by the electronic control unit 10 to thereby provide speed changing.

Figure 2:
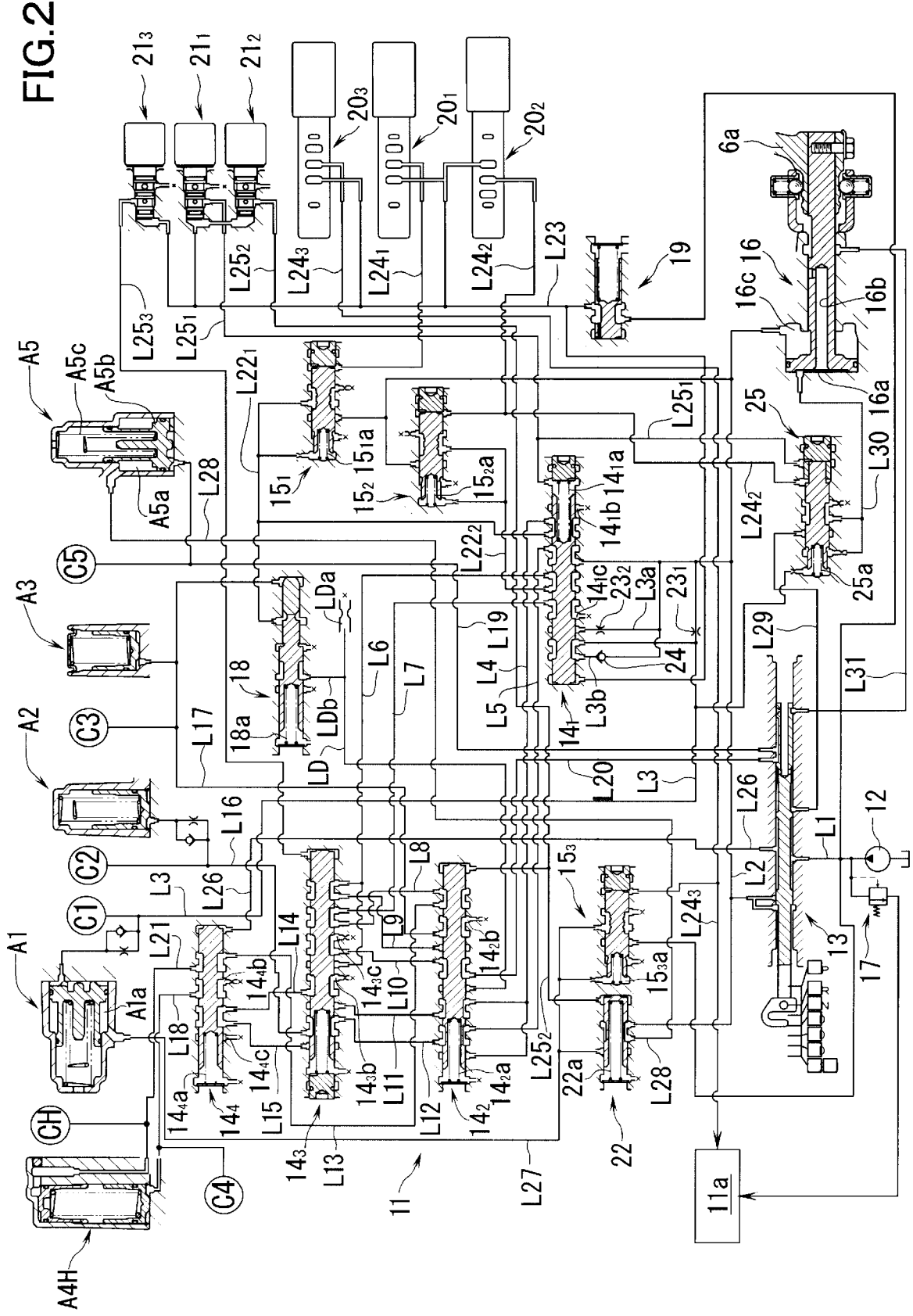
FIG. 2 is a diagram showing a hydraulic oil circuit of the transmission.

In the hydraulic circuit 11, there are provided, as shown in FIG. 2, the following: i.e., an oil pressure source 12 which is made up of a pump driven by the engine 2; a manual valve 13 which is operated in an interlocking relationship with the selector lever 9; switching means which are made up of first through fourth, i.e., a total of four, shift valves $14_1$, $14_2$, $14_3$, $14_4$; a pair of, i.e., first and second, pressure regulating valves $15_1$, $15_2$; and a servo valve 16 which switches between the forward running and the reverse running and which has connected thereto a shift fork 6a which is connected to the selector gear 6.

The manual valve 13 is switchable to a total of seven positions: i.e., "P" position which is a switchover portion when P range for parking is selected by the selector lever 9; "R" position which is a switchover position when R range for reverse running is selected; "N" position which is a switchover position when N range for a neutral state is selected; "$D_5$" position which is a switchover position when $D_5$ range for the 1st through the 5th automatic speed change ranges are selected; "$D_4$" position which is a switchover position when $D_4$ range for the 1st through the 4th automatic speed change ranges are selected; "$D_3$" position which is a switchover position when $D_3$ range for the 1st through the 3rd automatic speed change ranges are selected; and "2,1" position which is a switchover position when "2" range for holding the 2nd speed and "1" range for holding the 1st speed are selected, respectively.

In the "$D_5$" position of the manual valve 13, an oil passage L1 which is in communication with the oil pressure source 12 is connected to an oil passage L2 which is in communication with the first shift valve $14_1$. Pressurized oil whose pressure is regulated by a regulator 17 to a certain line pressure is supplied from the oil passage L1 to the oil passage L2. This pressurized oil is constantly supplied to the 1st-speed hydraulic clutch C1 through an oil passage L3 which is branched from the oil passage L2. The pressurized oil is also selectively supplied through the first–fourth shift valves $14_1$–$14_4$ to the 2nd-speed hydraulic clutch C2 through the 5th-speed hydraulic clutch C5, whereby an automatic speed changing between the 1st speed–5th speed is provided.

The connections of oil passages among these shift valves $14_1$–$14_4$ are as follows. Namely, the first and the second shift valves $14_1$, $14_2$ are connected together through two oil passages L4, L5. The first and the third shift valves $14_1$, $14_3$ are connected together through two oil passages L6, L7. The second and the third shift valves $14_2$, $14_3$ are connected together through five oil passages L8, L9, L10, L11, L12. The second and the fourth shift valves $14_2$, $14_4$ are connected together through one oil passage L13. The third and the fourth shift valves $14_3$, $14_4$ are connected together through two oil passages L14, L15. An oil passage L16 which is in communication with the 2nd-speed hydraulic clutch C2 is connected to the third shift valve $14_3$. An oil passage L17 which is in communication with the 3rd-speed hydraulic clutch C3 is connected to the second shift valve $14_2$. An oil passage L18 which is in communication with the 4th-speed hydraulic clutch C4 is connected to the fourth shift valve $14_4$. An oil passage L19 which is in communication with the 5th-speed hydraulic clutch C5 is connected to the second shift valve $14_2$ through an oil passage L20 which is connected to the oil passage L19 at the "$D_5$", "$D_4$" and "$D_3$" positions of the manual valve 13. Further, an oil passage L21 which is in communication with the 1st-speed holding hydraulic clutch CH is connected to the fourth shift valve $14_4$. To the second shift valve $14_2$ is connected an oil discharge passage LD which is in communication with an oil discharge control valve 18 which is described in more detail hereinafter. Still furthermore, to the first shift valve $14_1$ are connected oil passages $L22_1$, $L22_2$ which are on the output side of the first and the second pressure regulating valves $15_1$ $15_2$.

The input side of each of the first and the second pressure regulating valves $15_1$, $15_2$ has connected thereto the oil passage L2. By means of the oil pressure in oil passages $L24_1$, $L24_2$ which are on the output side of each of first and second linear solenoid valves $20_1$, $20_2$ which are connected to an oil passage L23 on an output side of a modulator valve 19 which reduces the line pressure from the oil passage L1 to a certain oil pressure (hereinafter called a modulator pressure) lower than the line pressure, each of the pressure regulating valves $15_1$, $15_2$ is forced to the leftward opening side. Further, each of the pressure regulating valves $15_1$, $15_2$ is also forced to the rightward closing side by urging forces of springs $15_1a$, $15_2a$ and by the oil pressures in the oil passages $L22_1$, $L22_2$ on the output side of each of the pressure regulating valves $15_1$, $15_2$. It is thus so arranged that the oil pressure in each of the oil passages $L22_1$, $L22_2$ is adjusted to the oil pressure depending on the output pressure of each of the linear solenoid valves $20_1$, $20_2$. To the oil passage L23, there is also connected a third linear solenoid valve $20_3$ which controls the engaging force of the lock-up clutch 3a, which is built in the fluid torque converter 3, through a hydraulic oil control circuit 11a for the lock-up clutch.

The oil passage L23 has connected thereto first–third open-close type of solenoid valves $21_1$, $21_2$, $21_3$. By means of these solenoid valves $21_1$, $21_2$, $21_3$, the first–the third shift valves $14_1$, $14_2$, $14_3$ are controlled for switchover operation. In other words, the first shift valve $14_1$, is forced to the left by the urging force of a spring $14_1a$ and by the oil pressure in an oil passage $L25_1$ on the output side of the first solenoid valve $21_1$, and is also forced to the right by the modulator pressure from the oil passage L23. When the oil pressure in the oil passage $L25_1$ has become the modulator pressure as a result of opening of the first solenoid valve $21_1$, the first shift valve $14_1$ is switched to the left position and, when the oil passage $L25_1$ has been opened to the atmosphere as a result of closing of the first solenoid valve $21_1$, the first shift valve $14_1$ is switched to the right position. Each of the second and the third shift valves $14_2$, $14_3$ is forced to the right by the urging force of a spring $14_2a$, $14_3a$ and is also forced to the left by the oil pressure in oil passages $L25_2$, $L25_3$ on the output side of each of the second and the third solenoid valves $21_2$, $21_3$. Each of the second and third shift valves $14_2$, $14_3$ is switched to the left position when the oil pressure in the oil passages $L25_2$, $L25_3$ has become the modulator pressure as a result of opening of each of the second and the third solenoid valves $21_2$, $21_3$, and is switched to the right position when the oil passages $L25_2$, $L25_3$ have been opened to the atmosphere as a result of closing of each of the second and the third solenoid valves $21_2$, $21_3$.

The fourth shift valve $14_4$ is forced to the right by an urging force of a spring $14_4a$ and is forced to the left by the oil pressure in an oil passage L26 which is connected to the oil passage L1 in the "$D_5$", "$D_4$" and "$D_3$" positions of the manual valve 13. In this manner, in the "$D_5$", "$D_4$" and "$D_3$" positions of the manual valve 13, the fourth shift valve $14_4$ is always restrained to the left position, and is switched to the right position when the oil passage L26 has been opened to atmosphere as a result of switching of the manual valve 13 to the "2, 1" position. When the fourth shift valve $14_4$ is in the left position, the oil passage L21 for the 1st-speed holding hydraulic clutch CH is connected to an oil discharge port $14_4b$ of the fourth shift valve $14_4$. In this manner, there occurs no connection of the 1st-speed holding hydraulic clutch CH in the "$D_5$", "$D_4$" and "$D_3$" positions.

The oil discharge control valve 18 which is disposed in the oil discharge passage LD is to open and close a bypass passage LDb which is in parallel with an oil discharge port LDa which is on a downstream end of the oil discharge passage LD and which is provided with an orifice. The oil discharge control valve 18 is forced to the rightward closing side by the urging force of a sprig 18a and is forced to the leftward opening side by the oil pressure in the oil passage L17 for the 3rd-speed hydraulic clutch C3 and by the oil pressure in the oil passage $L22_1$ on the output side of the first pressure regulator valve $15_1$. At the time of downshifting from the 5th-speed transmission train G5 to the 4th-speed transmission train G4, the 3rd-speed transmission train G3 or the 2nd-speed transmission train G2, the oil discharge control valve 18 opens when the oil pressure in the 4th-speed, the 3rd-speed, or the 2nd-speed hydraulic clutch, which is an on-coming clutch, has increased to a predetermined pressure. Thus, it operates to quickly release the 5th-speed hydraulic clutch C5, which is an off-going clutch.

In the hydraulic circuit 11, there are provided the following: namely, accumulators A1, A2, A3, A5 for the 1st, the 2nd, the 3rd and the 5th speeds which are respectively connected to the oil passages L3, L16, L17, L19 for the 1st-speed–5th-speed hydraulic clutches C1, C2, C3, C5; and an accumulator A4H which is used both for the 4th-speed and the 1st-speed holding and which has connected thereto the oil passage L18 for the 4th-speed hydraulic clutch C4 and the oil passage L21 for the 1st-speed holding clutch CH. An accumulator of a large capacity is used as the 1st-speed accumulator A1 to buffer the in-gear shocks. There is further provided a third pressure regulating valve $15_3$ which is controlled by the third linear solenoid valve $20_3$. An oil passage L27 on the output side of the third pressure regulating valve $15_3$ is connected to a back pressure chamber A1$a$ of the 1st-speed accumulator A1. The input side of the third pressure regulating valve $15_3$ as connected thereto the oil passage L1. By the oil pressure in an oil passage $L24_3$ on the output side of the third linear solenoid valve $20_3$, the third pressure regulating valve $15_3$ is forced to the leftward opening side in which the oil passage L1 and the oil passage L27 are connected together. Also, by the urging force of a spring $15_3a$ and the oil pressure in the oil passage L27, the third pressure regulating valve $15_3$ is forced to rightward closing side. In this manner, the oil pressure in the oil passage L27, i.e., the back pressure in the 1st-speed accumulator A1, is increased or decreased depending on the output pressure of the third linear solenoid valve $20_3$.

An accumulator of a large capacity is also used for the 5th-speed accumulator A5 so that it can cope with the skipped downshifting from the 5th-speed transmission train G5 to the 3rd-speed transmission train G3 or to the 2nd-speed transmission train G2. In addition, an oil passage L28 which is in communication with a back pressure chamber A5$a$ of the 5th-speed accumulator A5 can be selectively connected to the oil passage L2 and the oil passage L27 through a changeover valve 22 which is controlled by the second solenoid valve $21_2$. The changeover valve 22 is urged by a spring 22$a$ to the right position in which the oil passage L28 is connected to the oil passage L2 which serves as the oil passage in (or having) the line pressure, and is also forced, by the oil pressure in the oil passage $L25_2$ on the output side of the second solenoid valve $21_2$, to the left position in which the oil passage L28 is connected to the oil passage L27. In this manner, when the second solenoid valve $21_2$ is closed, the changeover valve 22 is switched to the right position, whereby the back pressure in the 5th-speed accumulator A5 becomes the line pressure which is supplied from the oil passage L2. On the other hand, when the second solenoid valve $21_2$ is opened, the changeover valve 22 is switched to the left position, whereby the back pressure in the 5th-speed accumulator A5 becomes a state in which it can be controlled by the third linear solenoid valve $20_3$ which serves as the pressure regulating means.

At the time of 1st-speed running with the manual valve 13 positioned in the "$D_5$" position, the first–the third shift valves $14_1$, $14_2$, $14_3$ are all switched to the right position. According to this arrangement, the oil passage L16 for the 2nd-speed hydraulic clutch C2 is connected to the oil passage $L22_1$ through the third shift valve $14_3$, the oil passage L12, the second shift valve $14_2$, the oil passage L5, and the first shift valve $14_1$. The oil passage L17 for the 3rd-speed hydraulic clutch C3 is connected to an oil discharge port $14_2b$ of the second shift valve $14_2$. The oil passage L18 for the 4th-speed hydraulic clutch C4 is connected to an oil discharge port $14_3b$ of the third shift valve $14_3$ through the fourth shift valve $14_4$ and the oil passage L14. The oil passage L19 for the 5th-speed hydraulic clutch C5 is connected to the oil discharge port $14_3c$ of the third shift valve $14_3$ through the oil passage L20, the second shift valve $14_2$ and the oil passage L10. In this manner, the oil pressure in the 3rd-speed hydraulic clutch C3 (hereinafter called 3rd-speed pressure), the oil pressure in the 4th-speed hydraulic clutch C4 (hereinafter called 4th-speed pressure), and the oil pressure in the 5th-speed hydraulic clutch C5 (hereinafter called 5th-speed pressure) all become the atmospheric pressure. On the other hand, the oil pressure in the 2nd-speed hydraulic clutch C2 (hereinafter called 2nd-speed pressure) becomes capable of being controlled by the first pressure regulating valve $15_1$, i.e., by the first linear solenoid valve $20_1$. Namely, the upshifting to the 2nd-speed is carried out by increasing the 2nd-speed pressure by means of the first linear solenoid valve $20_1$.

When the upshifting to the 2nd speed has been completed, the first shift valve $14_1$ is switched to the left position while holding both the second and the third shift valves $14_2$, $14_3$ to the right position. According to this arrangement, the connection of the oil passage L5 is switched to the oil passage L2, instead of to the oil passage $L22_1$. The 2nd-speed pressure is thus increased to the line pressure and the 2nd-speed hydraulic clutch C2 is completely engaged, whereby the running in the 2nd-speed transmission train G2 is provided.

At the time of gear engagement or gearing in (i.e., so called "in-gear" time) when the manual valve 13 is switched from the "N" position to the "$D_5$" position, the following in-gear control is carried out in order to reduce the in-gear shocks (i.e., shocks at the time of initial gear engagement). Namely, first of all, like at the time of 2nd-speed running, the first shift valve $14_1$ is moved to the left position and both the second and the third shift valves $14_2$, $14_3$ are moved to the right position. The driving torque of the driving wheels 4 is thus gradually increased by the power transmission through the 2nd-speed transmission train G2. Thereafter, while holding both the second and the third shift valves $14_2$, $14_3$ in the right position, the first shift valve $14_1$ is switched to the right position. Here, the oil passage L3 for the 1st-speed hydraulic clutch C1 is constantly communicated with the oil passage L2 through an orifice $23_1$. In the right position of the first shift valve $14_1$, the oil passage L3 is connected to the oil passage L2 through the oil supply bypass passage L3$a$ which has interposed therein an orifice $23_2$ and which is in parallel with the orifice $23_1$. On the other hand, in the left position of the first shift valve $14_1$, the oil passage L3 is connected to the oil passage L2 through the oil supply bypass passage L3$b$ which has interposed therein a check valve 24 for oil discharging and which is in parallel with the orifice $23_1$. In this manner, when the first shift valve $14_1$ is switched to the left position at the beginning of the in-gear operation, the 1st-speed hydraulic clutch C1 is supplied with oil only through the orifice $23_1$. Then, at the beginning of the in-gear operation, the back pressure of the 1st-speed accumulator A1 is kept low. As a result of the combined effect of restricting the oil supply by means of the orifice $23_1$, the rise in the oil pressure in the 1st-speed hydraulic clutch C1 (hereinafter called the 1st-speed pressure) is delayed or retarded. As a result, the 2nd-speed pressure rises earlier than the 1st-speed pressure, and the power transmission by the 2nd-speed transmission train G2 begins. Thereafter, the first shift valve $14_1$ is switched to the right position to thereby supply the oil to the 1st-speed hydraulic clutch C1 also through the oil supply bypass passage L3a. The back pressure of the 1st-speed accumulator A1 is also increased to thereby quickly increase the 1st-speed pressure, and the 2nd-speed pressure is decreased by the first solenoid valve $20_1$. In this manner, the 1st-speed transmission train G1 can be established at a good response while buffering the in-gear shocks. At the time of off-gear operation in which the manual valve 13 is switched from the forward running positions of "$D_5$"–"2,1" to the "N" position, the first shift valve $14_1$ is initially positioned in the right position, whereby the 1st-speed pressure is gradually reduced to buffer the off-gear shocks. Thereafter, the first shift valve $14_1$ is switched to the left position. As a result, by the oil discharging through the oil discharge bypass passage L3b, the 1st-speed pressure is rapidly reduced to the atmospheric pressure.

At the time of upshifting from the 2nd speed to the 3rd speed, the first—the third shift valves $14_1$, $14_2$, $14_3$ are switched to the state in which the first and the second shift valves $14_1$, $14_2$ are in the left position and that the third shift valve $14_3$ is in the right position. According to this arrangement, the oil passage L16 for the 2nd-speed hydraulic clutch C2 is connected to the oil passage $L22_1$ through the third shift valve $14_3$, the oil passage L12, the second shift valve $14_2$, the oil passage L4, and the first shift valve $14_1$. The oil passage L17 for the 3rd-speed hydraulic clutch C3 is connected to the oil passage $L22_2$ through the second shift valve $14_2$, the oil passage L9, the third shift valve $14_3$, the oil passage L6, and the first shift valve $14_1$. The oil passage L18 for the 4th-speed hydraulic clutch C4 is connected, in a manner similar to that in the 1st-speed running and the 2nd-speed running, to the oil discharge port $14_3b$ of the third shift valve $14_3$ through the fourth shift valve $14_4$ and the oil passage L14. The oil passage L19 for the 5th-speed hydraulic clutch C5 is connected to the oil discharge passage LD through the oil passage L20 and the second shift valve $14_2$. In this state, the 2nd-speed pressure and the 3rd-speed pressure respectively become capable of being controlled by the first linear solenoid valve $20_1$ and the second linear solenoid valve $20_2$, respectively. By performing the pressure decrease control of the 2nd-speed pressure by means of the first linear solenoid valve $20_1$, and the pressure increase control of the 3rd-speed pressure by means of the second linear solenoid valve $20_2$, the vehicle is up-shifted from the 2nd speed to the 3rd speed.

Once the upshifting to the 3rd speed has been completed, the first–the third shift valves $14_1$, $14_2$, $14_3$ are switched to such a state that the first shift valve $14_1$ is in the right position, that the second shift valve $14_2$ is in the left position, and that the third shift valve $14_3$ is in the right position. According to this arrangement, the oil passage L4 which has been connected to the 2nd-speed hydraulic clutch C2 in a route similar to that at the time of upshifting to the 3rd speed, is connected to an oil discharge port $14_1b$ of the first shift valve $14_1$, whereby the 2nd-speed pressure lowers to the atmospheric pressure. Also, the oil passage L6 which has been connected to the 3rd-speed hydraulic clutch C3 in a route similar to that at the time of upshifting to the 3rd speed, is connected to the oil passage L2 through the first shift valve $14_1$. As a result, the 3rd-speed pressure is increased to the line pressure and the 3rd-speed hydraulic clutch C3 is completely engaged, whereby the running in the 3rd-speed transmission train G3 is provided.

At the time of upshifting from the 3rd speed to the 4th speed, the first–the third shift valves $14_1$, $14_2$, $14_3$ are switched to such a state that the first shift valve $14_1$ is in the right position and that both the second and the third shift valves $14_2$, $14_3$ are in the left position. According to this operation, the oil passage L16 for the 2nd-speed hydraulic clutch C2 is connected to an oil discharge port $14_4c$ of the fourth shift valve $14_4$ through the third shift valve $14_3$ and the oil passage L15. The oil passage L17 for the 3rd-speed hydraulic clutch C3 is connected to the oil passage $L22_2$ through the second shift valve $14_2$, the oil passage L9, the third shift valve $14_3$, the oil passage L7, and the first shift valve $14_1$. The oil passage L18 for the 4th-speed hydraulic clutch C4 is connected to the oil passage $L22_1$ through the fourth shift valve $14_4$, the oil passage L14, the third shift valve $14_3$, the oil passage L11, the second shift valve $14_2$ and the first shift valve $14_1$. The oil passage L19 for the 5th-speed hydraulic clutch C5 is connected, in a manner similar to that at the time of upshifting to the 3rd speed and at the time of running at the 3rd speed, to the oil discharge passage LD through the oil passage L20 and the second shift valve $14_2$. In this state, the 3rd-speed pressure and the 4th-speed pressure respectively become capable of being controlled by the second linear solenoid valve $20_2$ and the first linear solenoid valve $20_1$. By thus performing the pressure decrease control of the 3rd-speed pressure by means of the second linear solenoid valve $20_2$ and the pressure increase control of the 4th-speed pressure by means of the first linear solenoid valve $20_1$, the vehicle is up-shifted from the 3rd speed to the 4th speed.

Once the upshifting to the 4th speed has been completed, the first–the third shift valves $14_1$, $14_2$, $14_3$ are switched to such a state that all of them are in the left position. According to this arrangement, the oil passage L7 which has been connected to the 3rd-speed hydraulic clutch C3 in a route similar to that at the time of upshifting to the 4th speed, is connected to an oil discharge port $14_1c$ of the first shift valve 141, whereby the 3rd-speed pressure lowers to the atmospheric pressure. Also, the oil passage L5 which has been connected to the 4th-speed hydraulic clutch C4 in a route similar to that at the time of upshifting to the 4th speed, is connected to the oil passage L2 through the first shift valve $14_1$. As a result, the 4th-speed pressure is increased to the line pressure and the 4th-speed hydraulic clutch C4 is thus completely engaged, whereby the running in the 4th-speed transmission train G4 is provided.

At the time of upshifting from the 4th speed to the 5th speed, the first–the third shift valves $14_1$, $14_2$, $14_3$ are switched to such a state that the first shift valve $14_1$ is in the left position, that the second shift valve $14_2$ is in the right position and that the third shift valve $14_3$ is in the left position. According to this arrangement, the oil passage L16 for the 2nd-speed hydraulic clutch C2 is connected to the oil discharge port $14_4c$ of the fourth shift valve $14_4$ through the third shift valve $14_3$ and the oil passage L15, in a manner similar to that at the time of upshifting to the 4th speed and at the time of running at the 4th speed. The oil passage L17 for the 3rd-speed hydraulic clutch C3 is connected to the oil discharge port $14_2b$ of the second shift valve $14_2$ in a manner similar to that at the time of running at the 1st speed and the 2nd speed. The oil passage L18 for the 4th-speed hydraulic clutch C4 is connected to the oil passage $L22_1$ through the fourth shift valve $14_4$, the oil passage L14, the third shift valve $14_3$, the oil passage L11, the second shift valve $14_2$, the oil passage L4, and the first shift valve $14_1$. The oil passage L19 for the 5th-speed hydraulic clutch C5 is connected to the oil passage $L22_2$ through the oil passage L20, the second shift valve $14_2$, the oil passage L10, the third shift valve $14_3$, the oil passage L6 and the first shift valve $14_1$. In this state, the 4th-speed pressure and the 5th-speed pressure become capable of being controlled by the first linear solenoid valve $20_1$ and the second linear solenoid valve $20_2$, respectively. By performing the pressure decrease control of the 4th-speed pressure by means of the first linear solenoid coil $20_1$ and the pressure increase control of the 5th-speed pressure by means of the second linear solenoid valve $20_2$, the vehicle is up-shifted from the 4th speed to the 5th speed. At this time, the changeover valve 22 is switched to the right position, and the back pressure of the 5th-speed accumulator A5 is in the line pressure. The 5th-speed hydraulic clutch C5 is substantially engaged before the pressure increases in the 5th-speed pressure is buffered by the accumulated pressure in the accumulator A5. Therefore, there is no possibility that the increase control of the 5th-speed pressure by means of the second linear solenoid valve $20_2$ is adversely affected.

Once the upshifting to the 5th-speed has been completed, the first–the third shift valves $14_1$, $14_2$, $14_3$ are switched to such a state that both the first and the second shift valves $14_1$, $14_2$ are in the right position and that the third shift valve $14_3$ is in the left position. According to this operation, the oil passage L4 which has been connected to the 4th-speed hydraulic clutch C4 in a route similar to that at the time of upshifting to the 5th speed, is connected to the oil discharge port $14_1b$ of the first shift valve $14_1$, whereby the 4th-speed pressure lowers to the atmospheric pressure. Also, the oil passage L6 which has been connected to the 5th-speed hydraulic clutch C5 in a route similar to that at the time of upshifting to the 5th speed, is connected to the oil passage L2 through the first shift valve $14_1$. As a result, the 5th-speed pressure is increased to the line pressure and the 5th-speed hydraulic clutch C5 is completely engaged, whereby the running in the 5th-speed transmission train G5 is provided.

The first–the third linear solenoid valves $20_1, 20_2, 20_3$ and the first–the third solenoid valves $21_1, 21_2, 21_3$ are controlled by the above-described electronic control unit 10. In the "$D_5$" range, these linear solenoid valves $20_1, 20_2, 20_3$ and the solenoid valves $21_1, 21_2, 21_3$ are controlled based on a speed change map which is set with the vehicle speed V and the throttle opening degree θ as parameters, whereby an automatic speed changing of the first speed–the fifth speed is provided.

Explanations have so far been made about the oil passage constitution and the speed change control in the "$D_5$" position of the manual valve 13. The constitution of the oil passages are the same in the "$D_4$" and "$D_3$" positions as in the "$D_5$" position. Then, in the "$D_4$" position, the automatic speed changing for the 1st speed–the 4th speed is performed based on the speed change map for the "$D_4$" range and in the "$D_3$" position, the automatic speed changing for the 1st speed–3rd speed is performed based on the speed change map for the $D_3$ range.

In "2, 1" position of the manual valve 13, the oil passage L19 for the 5th-speed hydraulic clutch C5 is opened to the atmosphere and, as described hereinabove, the fourth shift valve $14_4$ is switched to the right position. As a result, the oil passage L18 for the 4th-speed hydraulic clutch C4 is connected to the oil discharge port $14_4b$ of the fourth shift valve $14_4$. In this manner, the 5th-speed hydraulic clutch C5 and the 4th-speed hydraulic clutch C4 become incapable of being engaged. In addition, the oil passage L21 for the 1st-speed holding hydraulic clutch CH is connected to the oil passage L13 through the fourth shift valve $14_4$. When the first–the third shift valves $14_1$, $14_2$, $14_3$ are switched to the state of the 1st speed, the oil passage L13 is connected to the oil passage $L22_2$ through the second shift valve $14_2$, the oil passage L8, the third shift valve $14_3$, the oil passage L7 and the first shift valve $14_1$. In this manner, the oil pressure in the 1st-speed holding hydraulic clutch CH becomes capable of being controlled by the second linear solenoid valve $20_2$. When the first–the third shift valves $14_1$, $14_2$, $14_3$ are switched to the state of the 2nd speed, the oil passage L7 is connected to the oil discharge port $14_1c$ of the first shift valve $14_1$. When they are switched to the state of the 2nd–the 3rd speed changing and to the state of the 3rd speed, the oil passage L13 is connected to the oil discharge port $14_2b$ of the second shift valve $14_2$. In any of the above cases, the oil is not supplied to the 1st-speed holding hydraulic clutch CH. Then, when the "2" range or the "1" range is selected by the selector lever 9, if the vehicle is running at a high speed, the 3rd-speed transmission train G3 is established first. When the vehicle speed has been reduced below a predetermined speed, the vehicle is downshifted to the 2nd speed. When the "2" range is selected, the vehicle speed is kept to the 2nd speed. When the "1" range is selected, the vehicle is further downshifted to the 1st speed. At this time, by the pressure increase control by the second linear solenoid valve $20_2$, the 1st-speed holding hydraulic clutch CH is engaged. As a result, the 1st-speed transmission train G1 is established in a state in which the engine brake can be operated.

In the "R" position of the manual valve 13, the oil passage L2 and the oil passage L20 are opened to the atmosphere, and an oil passage L29 for the reverse running is connected to the oil passage L1. Then, a first oil chamber 16a on the left end of the servo valve 16 is supplied with oil through an oil passage L30 which is connected to the oil passage L29 through a servo control valve 25. According to this arrangement, the servo valve 16 is pushed to the rightward reverse running position. As a result, the selector gear 6 is switched to the reverse running side, and the oil passage L30 is connected to an oil passage L31 through that axial hole 16b in the servo valve 16 which is in communication with the first oil chamber 16a. The oil passage L31 is connected to the oil passage L19 for the 5th-speed hydraulic clutch C5 in the "R" position of the manual valve 13. In this manner, the oil is supplied to the 5th-speed hydraulic clutch C5 in a state in which the selector gear 6 is switched to the reverse running side, whereby the reverse transmission train GR is established. The servo valve 16 has formed therein a second oil chamber 16c for forcing the servo valve 16 to the forward running position on the left side. The oil passage L2 is connected to the second oil chamber 16c and, in the forward running ranges of "$D_5$"–"2,1" positions, the servo valve 16 is pushed to the forward running position on the left side, whereby the selector gear 6 is switched to the forward running side.

The servo control valve 25 is forced to the leftward open side in which the oil passage L29 and the oil passage L30 are connected, by the oil pressure in the oil passage $L25_1$ on the output side of the first solenoid valve $21_1$ and by the oil pressure in the oil passage $L25_2$ on the output side of the second linear solenoid valve $20_2$. The servo control valve 25 is also forced to the rightward closing side by the urging force of the spring 25a, by the oil pressure in the oil passage L3, and by the oil pressure in the oil passage L30. In the forward running range, the servo control valve 25 is restrained to the right end position by the line pressure in the oil passage L3. When the manual valve 13 is switched to the "R" position while the vehicle is running forward at a predetermined speed or above, the output pressure of the first solenoid valve $21_1$ and the output pressure of the second linear solenoid valve $20_2$ are both made low. The servo control valve 25 is thus held to the right end position by the urging force of the spring 25a. The connection between the oil passage L29 and the oil passage L30 is thereby shut off to prevent the reverse transmission train GR from being established.

The servo control valve 25 also serves the function as a pressure regulating valve in the "R" position to regulate the 5th speed. At the time of gearing in for the reverse running by switching to the "R" position, the pressure increase in the 5th-speed pressure is controlled by the second linear solenoid valve $20_2$, which serves as a pressure-regulating solenoid valve, through the servo control valve 25 as described hereinbelow. Further, the changeover valve 22 is switched to the left position to thereby connect the oil passage L28 to the oil passage L27. It is thus so arranged that the back-pressure in the accumulator AS for the 5th speed is controlled by the third linear solenoid valve $20_3$ through the third pressure-regulating valve $15_3$ to a value depending on the engine load.

Figure 3:
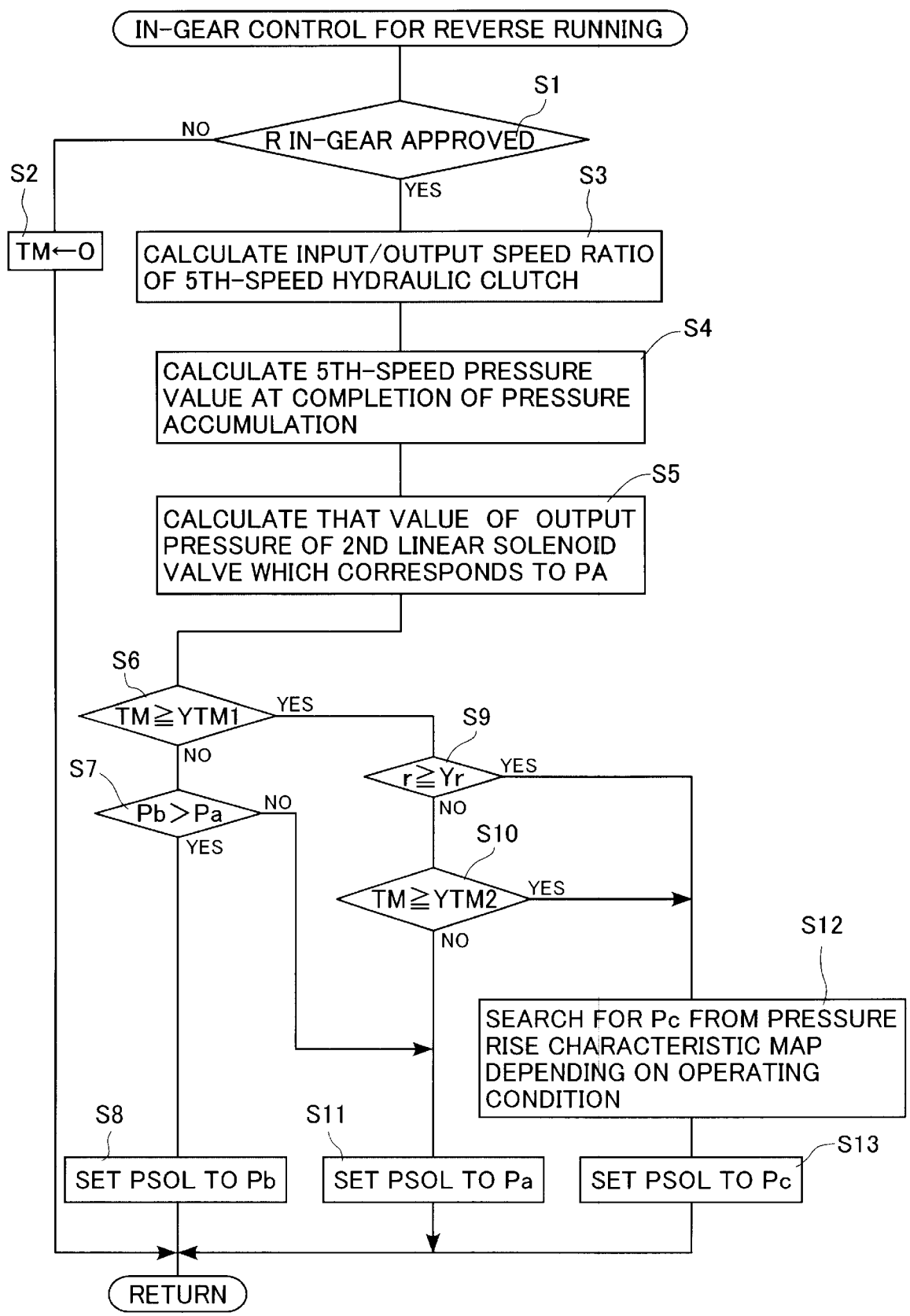
FIG. 3 is a flow chart showing the control program of a second linear solenoid valve at the time of gearing in for reverse running.

Details of control of the second linear solenoid valve $20_2$ at the time of gearing in for reverse running are shown in FIG. 3. First, at step S1, a discrimination is made as to whether the establishment of the reverse running stage® in-gear) has been approved or not. If the establishment of the R in-gear has not been approved, a time counter value TM is reset to zero at step S2, whereby one round of processing is finished. Once the R in-gear has been approved, an input/output speed ratio r is calculated, at step S3, by the following formula as a value to represent a degree of slipping of the 5th-speed hydraulic clutch C5, namely, $$r = Nout \times Gratio / Nin$$

where Gratio is a gear reduction ratio in the reverse transmission train GR. The input/output speed ratio r increases from 0 to 1 with a decrease in the degree of slipping in the 5th-speed hydraulic clutch C5. Then, at step S4, a 5th-speed pressure value PA at the time of completion of pressure accumulation in the 5th-speed accumulator A5 is obtained from a spring force of an accumulator spring A5c at the time of a full stroke of an accumulator piston A5b of the 5th-speed accumulator A5, and from an oil pressure (an output pressure of the 3rd pressure regulating valve $15_3$) to be inputted into a back pressure chamber A5a. At step S5, a calculation is made of that value of the output pressure of the 2nd linear solenoid valve $20_2$ which corresponds to PA, i.e., that output pressure value Pa of the 2nd linear solenoid valve $20_2$ which is required to cause the oil pressure in the oil passage L30, as an output pressure of the servo control valve 25, to coincide with PA.

At step S6, a discrimination is made as to whether the timer count value TM has exceeded a predetermined value YTM1 or not. If TM<YTM1, i.e., if a time YTM1 has not passed yet from the point of time of beginning of the R in-gear, a comparison is made at step S7 between a response pressure Pb, which is set in advance in order to early curtail an ineffective stroke in the 5th-speed hydraulic clutch C5, and the above-described output pressure value Pa. If Pb>Pa, an output pressure PSOL of the 2nd linear solenoid valve $20_2$ is set at step S8 to Pb. If a discrimination of TM≧YTM1 has been made after a lapse of the time YTM1 from the point of time of switching to the R range, a discrimination is made at step S9 as to whether the input/output speed ratio r has exceeded a predetermined value Yr which is set to correspond to the one at the time of completion of pressure accumulation in the 5th-speed accumulator A5, i.e., as to whether the degree of slipping of the 5th-speed hydraulic clutch C5 has fallen below a predetermined degree of slipping which corresponds to the one at the time of completion of pressure accumulation. If r<Yr, a discrimination is made at step S10 as to whether the timer count value TM has exceeded a predetermined value YTM2 which serves as a basis for discrimination of an abnormality. If TM<YTM2, the output pressure PSOL of the second linear solenoid valve $20_2$ is set to Pa at step S11. If a discrimination of Pb≦Pa has been made, the program also proceeds to step S11.

If a discrimination of r≧Yr has been made, i.e., if the pressure accumulation in the 5th-speed accumulator A5 has been completed, a search is made at step S12 for an oil pressure value Pc from a pressure rise characteristic map which is set with values to represent driving conditions such as the engine load, the input/output speed ratio r, or the like as parameters. Then, at step S13, the output pressure PSOL of the second linear solenoid valve $20_2$ is set to Pc. Also when the 5th-speed hydraulic clutch C5 keeps on slipping due to abnormal wear of the 5th-speed hydraulic clutch C5 and, consequently, a condition of TM≧YTM2 has been attained while the input/output speed ratio r has not increased to the predetermined value Yr, the program proceeds to step S12 and following steps to thereby set the output pressure of the second linear solenoid valve $20_2$ to Pc.

Figure 4:
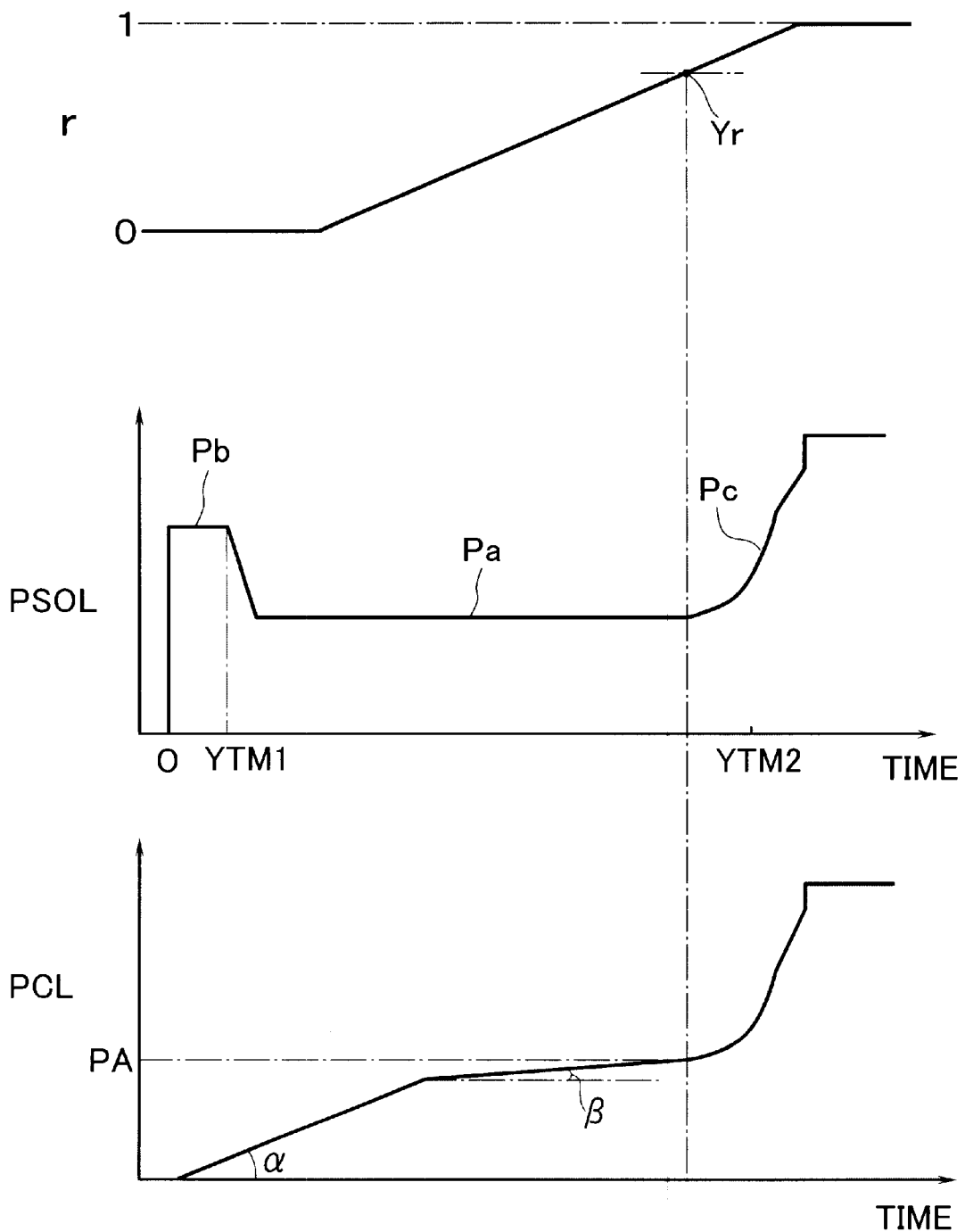
FIG. 4 is a time chart showing the changes in the input and output speed ratio "r" of a 5th-speed hydraulic clutch (hydraulic engaging element for reverse running), an output pressure PSOL of the second linear solenoid valve, and a 5th-speed pressure PCL at the time of gearing in for reverse running by the control in FIG. 3.

In this manner, at the time of gearing in for reverse running with the throttle valve fully closed, as shown in FIG. 4, the output pressure PSOL of the second linear solenoid valve $20_2$ is maintained at the response pressure Pb for the predetermined period of time YTM1 at the beginning of gearing in. The output pressure PSOL is thereafter decreased to the predetermined pressure Pa and is maintained at the predetermined pressure Pa until the input/output speed ratio r reaches the predetermined value Yr. After the condition of r≧Yr has been attained, the output pressure PSOL is increased from the predetermined pressure Pa at a value Pc of the pressure increase characteristics depending on the driving conditions. The 5th-speed PCL initially increases at a slope of α. Thereafter, with the start of pressure accumulation in the 5th-speed accumulator A5, the increase in the 5th-speed pressure PCL is buffered, whereby the increase slope becomes β which is more gradual or flatter than α. After the completion of pressure accumulation, the 5th-speed pressure PCL is increased from the value PA, which is at the time of completion of pressure accumulation, to the line pressure at pressure increase characteristics corresponding to the increase in the output pressure PSOL of the second linear solenoid valve $20_2$. Further, at the time of gearing in for reverse running while an accelerator pedal is being depressed, the value PA of the 5th-speed pressure PCL at the time of completion of pressure accumulation becomes larger than the value at the time of gearing in with the throttle valve being fully closed, due to an increase in the back pressure of the 5th-speed accumulator A5. As a result, the predetermined pressure Pa, which is the output pressure of the second linear solenoid valve $20_2$ corresponding to the value PA, sometimes exceeds the response pressure Pb. In such a case, the output pressure PSOL of the second linear solenoid valve $20_2$ becomes the predetermined pressure Pa from the beginning of gearing in. When the input/output speed ratio r does not reach the predetermined value Yr even after the lapse of the time YTM2 from the start of the gearing in, the output pressure PSOL of the second linear solenoid valve $20_2$ is increased at required pressure increase characteristics from the point of time of the lapse of YTM2. The 5th-speed pressure PCL is thus increased to the line pressure at pressure increase characteristics corresponding to the above-described pressure increase characteristics. In this case, though not shown in FIG. 3, when a condition TM=YTM2 has been satisfied, the back pressure of the 5th-speed accumulator A5 is made to zero (atmospheric pressure), whereby the pressure accumulation in the 5th-speed accumulator A5 is quickly completed.

The above-described increase slopes α, β of the 5th speed pressure PCL increase or decrease depending on the increase or decrease in the output pressure PSOL of the second linear solenoid valve $20_2$. When the output pressure PSOL is made to the above-described predetermined pressure Pa, increase slopes α, β become relatively small. Therefore, much time is required before the completion of engagement of the 5th-speed hydraulic clutch C5, resulting in a poor response in the gearing in for the reverse running.

Figure 5:
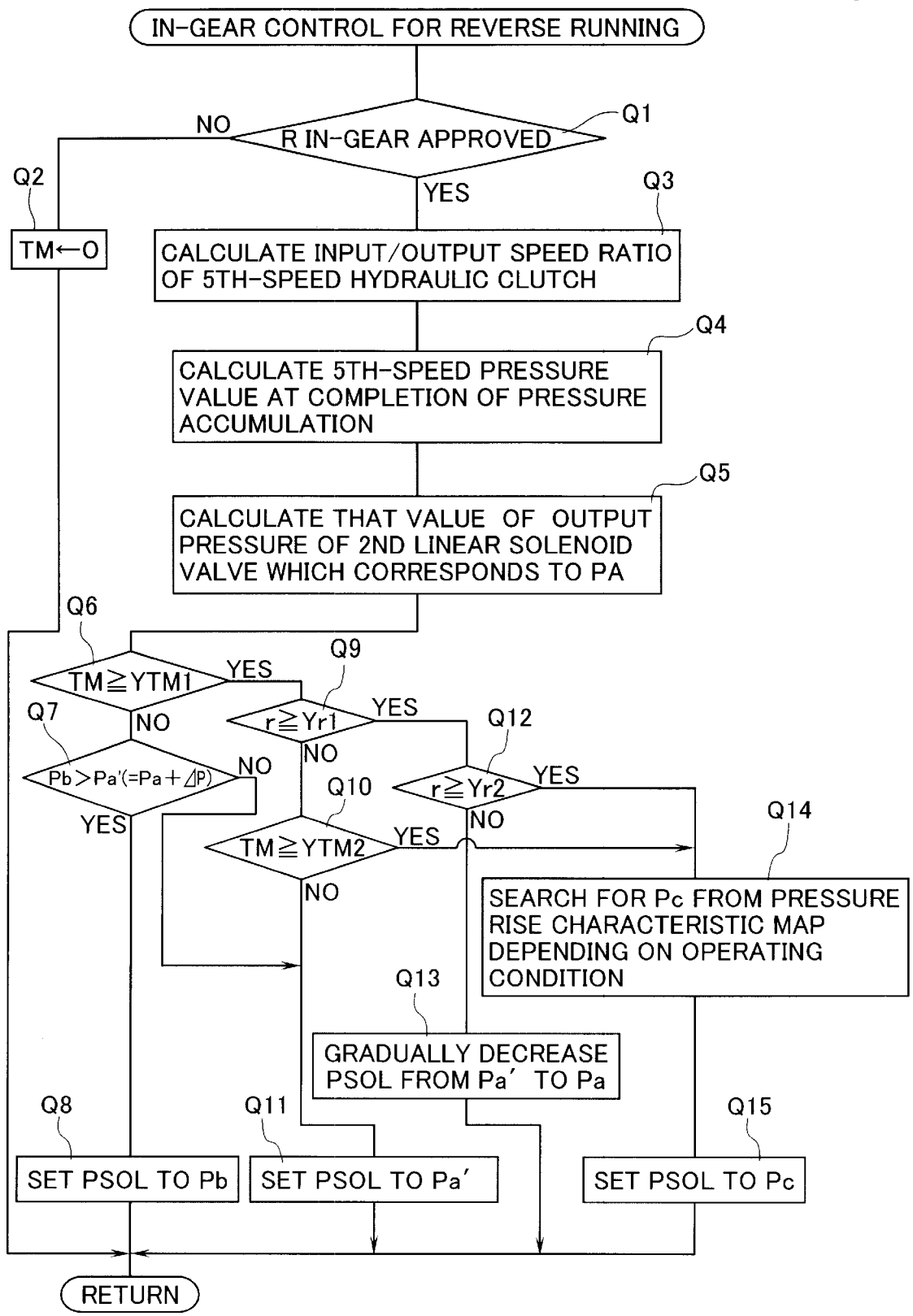
FIG. 5 is a flow chart showing another control program of the second linear solenoid valve at the time of gearing in for reverse running.

FIG. 5 shows a second embodiment of the control of gearing in for the reverse running in which the above-described disadvantage has been solved. Steps Q1 through Q6 in FIG. 5 are the same as the steps S1 through S6 in FIG. 3. In the control shown in FIG. 5, when a discrimination of TM<YTM1 has been made at step Q6, a comparison is made at step Q7 between the response pressure Pb and a value Pa' which is obtained by adding a predetermined value ΔP to Pa. If Pb>Pa', the output pressure PSOL of the second linear solenoid valve $20_2$ is set to the response pressure Pb at step Q8.

Figure 6:
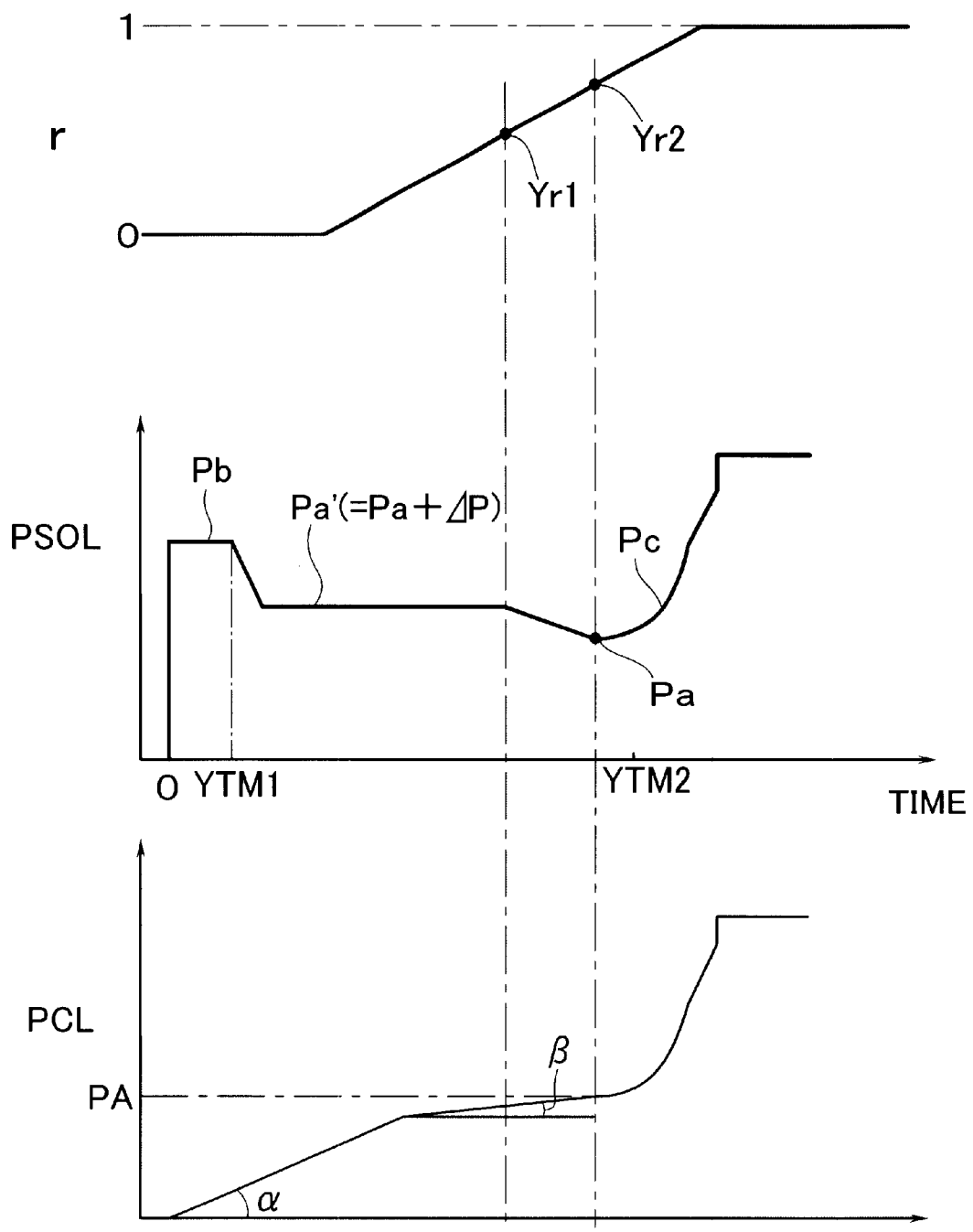
FIG. 6 is a time chart showing the changes in the input and output speed ratio "r" of the 5th-speed hydraulic clutch, an output pressure PSOL of the second linear solenoid valve, and a 5th-speed pressure PCL at the time of gearing in for reverse running by the control in FIG. 5.

As values to discriminate the input/output speed ratio r, there are set the following as shown in FIG. 6, i.e., a first value Yr1 which corresponds to the state under pressure accumulation in the 5th-speed accumulator A5, and a second value Yr2 which corresponds to the time of completion of accumulation in the 5th-speed accumulator A5. When a discrimination of TM≧YTM1 has been made at step Q6, a discrimination is made at step Q9 as to whether the input/output speed ratio r has exceeded Yr1 or not. If r<Yr1, a discrimination is made at step Q10 as to whether TM≧YTM2 or not. If TM<YTM2, the output pressure PSOL of the second linear solenoid valve $20_2$ is set to Pa' at step Q11. In this manner, as compared with the control shown in FIG. 3 in which PSOL is maintained at Pa, the increase slopes α, β of the 5th-speed pressure PCL become larger, and the response of the gearing in for the reverse running is improved. However, if the PSOL is maintained at Pa' until the completion of the pressure accumulation of the 5th-speed accumulator A5, the 5th-speed pressure PCL will rapidly increase, upon completion of the pressure accumulation, from the value PA at the time of completion of pressure accumulation to the value corresponding to Pa'. As a result, shocks will occur.

As a solution, if a discrimination of r≧Yr1 is made at step Q9, a discrimination is made at step Q12 as to whether the input/output speed ratio r has exceeded Yr2 or not. The output pressure PSOL of the second linear solenoid valve $20_2$ is gradually decreased at step Q13 until a state of r≧Yr2 is satisfied, i.e., by the time the pressure accumulation in the 5th-speed accumulator A5 is completed. It is thus so arranged that the 5th-speed pressure PCL is prevented from rapidly increasing from PA right after the completion of pressure accumulation. If an arrangement is made that, as soon as the condition of r≧Yr1 has been satisfied, the back pressure of the 5th-speed accumulator A5 is decreased, depending on the decrease in PSOL, from the value corresponding to the engine load, the delay in the completion of pressure accumulation due to the decrease in PSOL can advantageously be avoided.

If a discrimination of r≧Yr2 is made at step Q12, a search is made at step Q14 for the oil pressure value Pc from the pressure increase characteristic map which is set with values to represent the driving conditions such as engine load, or the like, as parameters. At step Q15, the output pressure PSOL of the second linear solenoid valve $20_2$ is set to Pc, and the 5th-speed pressure PCL is increased to the line pressure at a pressure increase characteristic corresponding to the increase in the PSOL. Also when the input/output speed ratio r does not reach Yr1 after the lapse of time YTM2 from the start of the gearing in, the program proceeds to step Q14 and following steps to thereby set the PSOL to Pc, whereby the 5th-speed pressure PCL is increased to the line pressure at a predetermined pressure increase characteristic. Further, at the time when a condition of TM=YTM2 has been attained, the back pressure in the 5th-speed accumulator A5 is made zero (atmospheric pressure), whereby the pressure accumulation in the 5th-speed accumulator A5 is quickly completed.

In any of the controls shown in FIGS. 3 and 5, when the accelerator is depressed just before the completion of pressure accumulation in the 5th-speed accumulator A5 at the time of gearing in for the reverse running with the throttle valve fully closed, the occurrence of shocks can be prevented by the pressure increase control of the 5th-speed pressure PCL by means of the output pressure PSOL of the second linear solenoid valve $20_2$ after the completion of the pressure accumulation. It is preferable to correct each of the values Pa, Pb, Pc of PSOL depending on the oil temperature in the transmission. It is also preferable to shift or replace the discrimination values Yr, Yr1, Yr2 based on the input/output speed ratio r, and the timer value YTM2 for discriminating abnormality, depending on the engine load, the oil temperature in the transmission, or the like.

Explanations have so far been made about the embodiment in which the present invention is applied to the control at the time of gearing in for reverse running of the 5th-speed hydraulic clutch C5 which establishes the reverse transmission train. In case the 1st-speed transmission train is established without going through the 2nd-speed transmission train at the time of gearing in for the forward running, the present invention can similarly be applied to the control of the 1st-speed hydraulic clutch C5 at the time of gearing in for forward running.

As can be seen from the above explanations, according to the present invention, even if the accuracy, in the low pressure region, of the oil pressure control of the hydraulic engaging element by means of the pressure regulating solenoid valve becomes poor as a result of deviations in the performance due to mass production thereof, the oil pressure control in the low pressure region is shared by the accumulator. The shocks at the time of gearing in with the throttle valve fully closed can thus be buffered. Further, even if the oil pressure in the hydraulic engaging element can no longer be appropriately controlled by the depression of accelerator pedal just before the completion of the pressure accumulation, the shocks can be buffered by controlling the oil pressure in the hydraulic engaging element by means of the pressure regulating solenoid valve after the completion of pressure accumulation. In this manner, the shocks can surely be buffered in any driving state.

It is readily apparent that the above-described control apparatus for a hydraulically-operated vehicular transmission meets all of the objects mentioned above and also has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. A control apparatus for a hydraulically-operated vehicular transmission comprising:

a pressure regulating solenoid valve for controlling an oil pressure in a hydraulic engaging element which establishes a predetermined speed transmission train of the hydraulically-operated vehicular transmission;

an accumulator connected to an oil passage which is communicated with said hydraulic engaging element;

discriminating means for discriminating whether the pressure accumulation in said accumulator has been completed or not; and control means for maintaining an outlet pressure of said pressure regulating solenoid valve at a predetermined pressure until the pressure accumulation in said accumulator has been completed and for increasing the output pressure of said pressure regulating solenoid valve, after the pressure accumulation in said accumulator has been completed, depending on a driving condition of the vehicle.

2. The apparatus according to claim 1, further comprising:

detecting means for detecting a degree of slipping in said hydraulic engaging element, wherein said detecting means discriminates that the pressure accumulation in said accumulator has been completed when said degree of slipping has been lowered to a predetermined value.

3. A control apparatus for a hydraulically-operated vehicular transmission comprising:

a pressure regulating solenoid valve for controlling an oil pressure in a hydraulic engaging element which establishes a predetermined speed transmission train of the hydraulically-operated vehicular transmission;

an accumulator connected to an oil passage which is communicated with said hydraulic engaging element;

detecting means for detecting a degree of slipping in said hydraulic engaging element; and control means for controlling such:

that an output pressure of said pressure regulating solenoid valve is maintained at a predetermined pressure until said degree of slipping lowers to a predetermined first value;

that the output pressure of said pressure regulating solenoid valve is gradually decreased from said predetermined pressure after said degree of slipping has lowered below said predetermined first value until said degree of slipping lowers to a predetermined second value; and that, after said degree of slipping has fallen below said predetermined second value, said output pressure of said pressure regulating solenoid valve is increased at a pressure increase characteristic depending on a driving condition of the vehicle.

* * * * *